(12) United States Patent
Bartsch et al.

(10) Patent No.: US 11,235,456 B2
(45) Date of Patent: Feb. 1, 2022

(54) SECURING DEVICE AND METHOD FOR OPERATING A SECURING DEVICE

(71) Applicant: M-ROBOT OHG, Wahlsburg (DE)

(72) Inventors: Patrick Bartsch, Meckenbeuren (DE); Dirk Brisse, Kressbronn (DE)

(73) Assignee: M-ROBOT OHG, Wahlsburg (DE)

( * ) Notice: Subject to any disclaimer, the term of this patent is extended or adjusted under 35 U.S.C. 154(b) by 276 days.

(21) Appl. No.: 16/551,904

(22) Filed: Aug. 27, 2019

(65) Prior Publication Data
US 2020/0070337 A1 Mar. 5, 2020

(30) Foreign Application Priority Data

Sep. 5, 2018 (DE) .......................... 102018121701.3

(51) Int. Cl.
  *B25J 9/00* (2006.01)
  *B25J 9/12* (2006.01)
  *B25J 19/00* (2006.01)

(52) U.S. Cl.
  CPC ............. *B25J 9/0009* (2013.01); *B25J 9/126* (2013.01); *B25J 19/0004* (2013.01)

(58) Field of Classification Search
  CPC ...... B25J 19/0004; B25J 9/0009; B25J 9/126; F16D 25/0632; F16D 59/02; F16D 2065/024; F16D 2021/06; F16D 2021/10
  See application file for complete search history.

(56) References Cited

U.S. PATENT DOCUMENTS

| 4,566,575 A | 1/1986 | Sekella |
| 4,693,665 A * | 9/1987 | Friederichs .............. B25J 9/046 |
| | | 188/72.4 |
| 4,842,114 A | 6/1989 | Hepp |
| 4,848,546 A | 7/1989 | McCormick et al. |
| 8,136,640 B2 * | 3/2012 | Zimmer .................. F16D 53/00 |
| | | 188/72.7 |

FOREIGN PATENT DOCUMENTS

| DE | 2837676 A1 | 4/1979 |
| EP | 0987514 A2 | 3/2000 |
| GB | 2006340 A | 5/1979 |
| JP | 2014020515 A | 2/2014 |
| WO | 2017012626 A1 | 1/2017 |
| WO | 2018153444 A1 | 8/2018 |

* cited by examiner

*Primary Examiner* — Richard M Lorence
(74) *Attorney, Agent, or Firm* — Hamre, Schumann, Mueller & Larson, P.C.

(57) ABSTRACT

A securing device for a rotatably mounted object with at least one receiving unit, which is fixed against rotation on a first component of the object with at least one clamping unit which is fixed against rotation to a second component of the object, which manually or by means of a rotary drive is moveable relative to the first component via a rotatably mounted joint about a rotational and/or swivel axis, and with at least one drive unit through which the clamping unit can be transferred from a release position, in which the first component and the second component are released for rotation relative to each other to a clamping position, in which the clamping unit frictionally and/or non-positively engages in the receiving unit, and the first component and the second component are fixed relative to each other against rotation about the rotary and/or swivel axis.

10 Claims, 2 Drawing Sheets

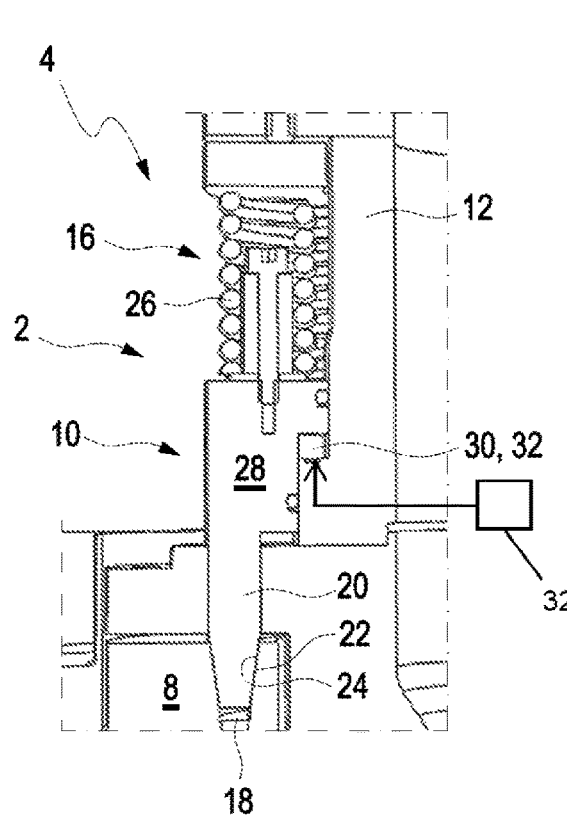
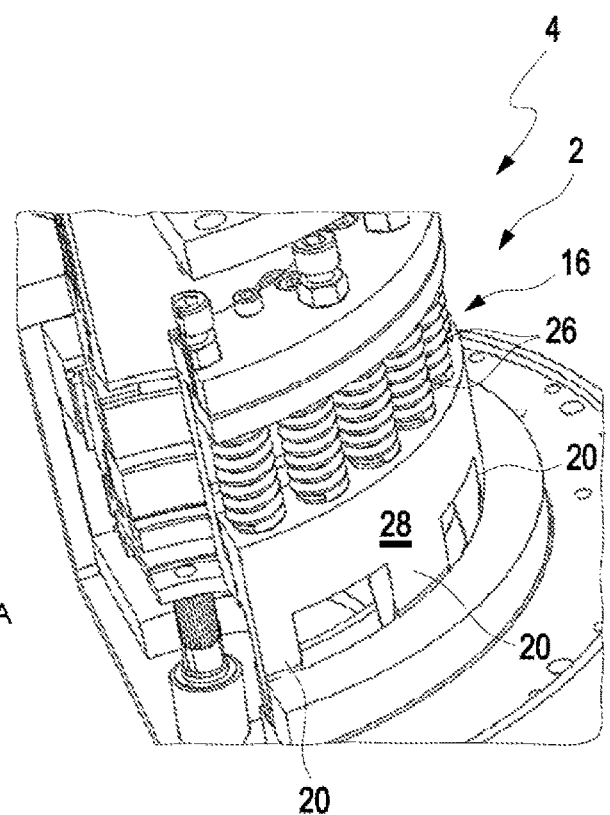
Fig. 2    Fig. 3
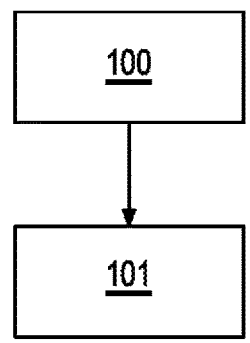
Fig. 4

SECURING DEVICE AND METHOD FOR OPERATING A SECURING DEVICE

CROSS REFERENCE TO RELATED APPLICATIONS

This application claims priority to Germany application DE 10 2018 121 701.3, filed Sep. 5, 2018, which is incorporated by reference in its entirety.

FIELD OF THE INVENTION

The invention relates to a securing device and a method for operating a securing device.

BACKGROUND OF THE INVENTION

There are securing devices for manipulators, such as industrial robots, known in which the manipulators are controlled by mechanical transmission.

The components include, for example, manipulator arms or robotic arms. When the mechanical drives are at a standstill, the gearboxes fix the robot arms at a standstill relative to one another.

In addition, securing devices for components are known in which additional brakes are provided, which, similar to a disc brake surface, fix the components relative to each other by means of static friction.

In addition, manipulators are known with direct drive, thus manipulators in which the individual manipulator arms are electromagnetically driven and movable relative to each other. Such manipulators work mostly gearless, which makes it difficult to fix the manipulator arms with an engine brake.

SUMMARY OF THE INVENTION

An object of an embodiment of the invention is to propose an alternative, expedient design of a relative fixing of two components.

This object is achieved by a securing device for a rotatably mounted object, such as a manipulator, with at least one receiving unit, which is fixed against rotation on a first component of the object, with at least one clamping unit which is fixed against rotation to a second component of the object, which manually or by means of a rotary drive, in particular direct drive, is moveable relative to the first component via a rotatably mounted joint about a rotational and/or swivel axis, and with at least one drive unit through which the clamping unit can be transferred from a release position, in which the first component and the second component are released for rotation relative to each other, parallel to the rotational and/or swivel axis to a clamping position, in which the clamping unit frictionally and/or non-positively engages in the receiving unit, and the first component and the second component are fixed relative to each other against rotation about the rotary and/or swivel axis.

The securing device can be formed compactly in that the clamping unit can be transferred parallel to the rotational and/or swivel axis in a clamping position. In addition, this provides an alternative of suitable designs.

The rotatably mounted object may basically be any type of object in which a component is rotatably moved relative to a second component. For example, the object may include a manipulator, in particular industrial robots, in particular with direct drive. In this case, the first component may comprise a first arm element of a robot arm and the second component may comprise a second arm element of the robot arm.

Moreover, it is conceivable that the rotatably mounted object comprises a turntable, a drive spindle or the like.

The receiving unit may be formed, for example, with a bore belt. In this case, the clamping unit would be arranged in a plurality of discrete clamping positions within the receiving unit. The securing device operates continuously, if the at least one receiving unit comprises at least one recess running concentric to the rotational axis and/or swivel axis and extending in the direction of the rotational axis and/or swivel axis and/or if the at least one clamping unit comprises at least a clamping means which is movable in the recess and can be arranged directly adjacent frictionally and/or non-positively.

In order to ensure a reception of the clamping means of the clamping unit in the recess of the receiving unit when transferring from the release position into the clamping position, it proves to be advantageous if the at least one clamping means of the clamping unit, on the side facing the recess of the receiving unit comprises in particular a tapered, guide section and/or if the recess of the receiving unit, on the side facing the clamping means of the clamping unit, comprises in a particular funnel-like, receiving section.

As a result, the receiving unit and clamping unit are automatically centered to each other when the clamping means is inserted into the recess. In addition, a raised contact surface between the clamping means and recess is realised by the funnel-like receiving section with respect to the transfer direction parallel to the rotational and/or swivel axis. As a result, higher friction and contact forces can be achieved, whereby the clamping action between recess and clamping means is improved.

It proves to be particularly advantageous if the guide section of the clamping means and/or the receiving section of the recess with respect to the rotational and/or swivel axis comprises an angle of 0° to 30°, in particular 5° to 25°, in particular 10° to 20° and/or if the guide section of the clamping means and/or the receiving section of the recess comprises a surface and/or a surface coating having a coefficient of friction between 0.05 and 0.8, in particular between 0.1 and 0.5.

Within the angular ranges mentioned, particularly high coefficients of friction and, as a result, effective frictional connection of the clamping means of the clamping unit with the recess of the receiving unit can be achieved.

By providing the surface of the clamping means and/or the receiving section with a coefficient of friction between 0.05 and 0.8, the frictional forces acting between clamping means and recess can be further increased. Additionally or alternatively, the surface of the clamping means and/or the receiving section may be provided with an additional surface coating, which comprises a corresponding coefficient of friction.

The surface coating may comprise, for example, a metal, a plastic, a rubber and/or wood. In one embodiment, the clamping means and recess each comprise aluminium having a coefficient of friction of 0.2.

The drive unit can in principle be of any desired design, as long as it fulfils the technical function of transferring the clamping unit from the release position into the locking position. It is conceivable that the drive unit comprises at least one pneumatic, hydraulic and/or mechanical tensionable spring means, in particular a hydraulic or pneumatic cylinder and/or a spring element, which clamps the at least one clamping means with a clamping force in the clamping position and/or the drive unit comprises at least one pneumatic, hydraulic and/or mechanical effective locking means which fixes the at least one clamping means in the release position.

Characterised in that the drive unit comprises a spring means which tensions the clamping means with a clamping force in the clamping position, the clamping means can be transferred at any time from the release position into the clamping position. Because the drive unit comprises the locking means, the prestressed at least one clamping means can be fixed in the release position despite the high-acting clamping forces.

The at least one locking means can in principle be of any desired design, as long as it fulfils the technical function of fixing the clamping means against a transfer from the release position into the clamping position. For example, the locking means may be formed like a bolt and form on the clamping means a rear handle with respect to the rotational and/or swivel axis.

In a further development of the drive unit it is intended that the locking means of the drive unit comprises in a basic position a counteracting and equal restoring force to the clamping force of the spring means, with which the locking means acts on the clamping means and holds by force equilibrium in the release position, and that the locking means in an emergency position comprises a reduced restoring force relative to the basic position and releases the clamping means for transferring into the clamping position.

By forming the locking means such that it counteracts with a restoring force the clamping force, the locking means at the same time also comprises a return means, whereby the clamping means can be transferred by the locking means from the clamping position into the release position. In this case, the restoring force of the locking means is increased until the restoring force is equal to the clamping force of the spring means in terms of amount.

In this case, the locking means can be realised technically simple if the locking means comprises a pressurisable, hydraulically or pneumatically effective fluid, which runs in a cavity, in particular concentrically arranged or arrangeable around the rotational and/or swivel axis, between the clamping means of the clamping unit and the second component of the object arranged cavity and/or that the drive unit comprises a ring line and at least one valve, through which the cavity can be brought into fluid communication with the ring line.

A pressure of for example 100 Pa can act in the cavity. Furthermore, it is conceivable that via the valve and the ring line, a volume flow of the fluid of 40 l/min can switch the locking means without pressure.

In order to automatically and quickly transfer the clamping means of the clamping unit from the release position into the clamping position, it proves to be advantageous if the securing device comprises at least one control unit, by which at least the restoring force of the locking means of the drive unit for transferring the at least one clamping means in the clamping position is adjustable, in particular by which the valve for opening and closing can be controlled and if the securing device comprises at least one sensor means, assigned or assignable to at least one control unit, through which at least one triggering condition for transferring the locking means for transferring from the basic position can be detected in the emergency position and/or by which a pressure in the cavity can be detected.

The trigger condition may be, for example, an emergency stop, a power failure, a safety stop, a stoppage of the manipulator motor protection, a failure of the cooling circuit and/or a hydraulic and/or pneumatic failure.

In this case, it is ensured that the first component and the second component are fixed relative to one another and a risk of injury, for example to an operator, is reduced.

In principle, it is conceivable that the clamping unit comprises only a single clamping means. In one embodiment of the securing device, it is provided that the clamping unit comprises a plurality of clamping means, which are arranged on an annular support and/or that the second component comprises a plurality of through holes extending parallel to the rotational and/or swivel axis, in which the plurality of clamping means are arranged, wherein the annular support lies in the release position to the second component spaced and moves in the clamping position with respect to the release position in the direction of the second component and/or rests against the second component.

Through the above-described embodiment of the individual components, a simple coupling of the first component with the second component is made possible.

Moreover, it proves to be advantageous if the drive unit comprises a plurality of spring means, which are arranged like a coronet, and concentric to the rotational and/or swivel axis and jointly clamp the clamping unit, in particular abutting the ring-like support, in the clamping position.

As a result, an at least almost homogeneous force distribution of the clamping force of the spring means can be achieved, whereby the risk of tilting is reduced when transferring the clamping unit from the release position into the clamping position.

Moreover, in one embodiment of the securing device, it proves to be advantageous if the at least one receiving unit and the first component comprise a common component and/or if the receiving unit comprises a flange which can be fixed or is fixed detachably or non-detachably directly or indirectly and non-rotatably on the first component.

As a result, the securing device can be made compact.

Finally, the object is achieved by a method for operating a securing device of a rotatably mounted object, such as a manipulator, in particular industrial robot, in particular with direct drive, the at least one receiving unit which is fixed against rotation on a first component of the object, of the at least one clamping unit, which is fixed non-rotatably on a second component of the object, which is manually or by means of a rotary drive, in particular direct drive, moveable relative to the first component via a rotatably mounted joint about a rotational and/or swivel axis, and which comprises at least one drive unit, comprising the steps:

a. Detecting a triggering condition by sensor means associated with the control unit;

b. Directing the drive unit for transferring the clamping unit from a release position, in which the first component and the second component are released for moving, in particular rotating, relative to each other, in a locking position in which the clamping unit engages the receiving unit frictionally and/or non-positively, and fixes the first component and the second component against moving relative to each other.

Further features, details and advantages of the invention will become apparent from the appended claims, the drawings and the following description of a preferred embodiment of the securing device and the method.

BRIEF DESCRIPTION OF THE DRAWINGS

The drawing shows the following:

FIG. 2 is a sectional detail view of the clamping unit, the receiving unit and the drive unit of the securing device according to FIG. 1;

FIG. 3 is a cutaway perspective detailed view of the clamping unit of the securing device according to FIG. 1

FIG. 4 is a schematic flow diagram of the method according to the invention.

DETAILED DESCRIPTION OF THE INVENTION

Figure 1:
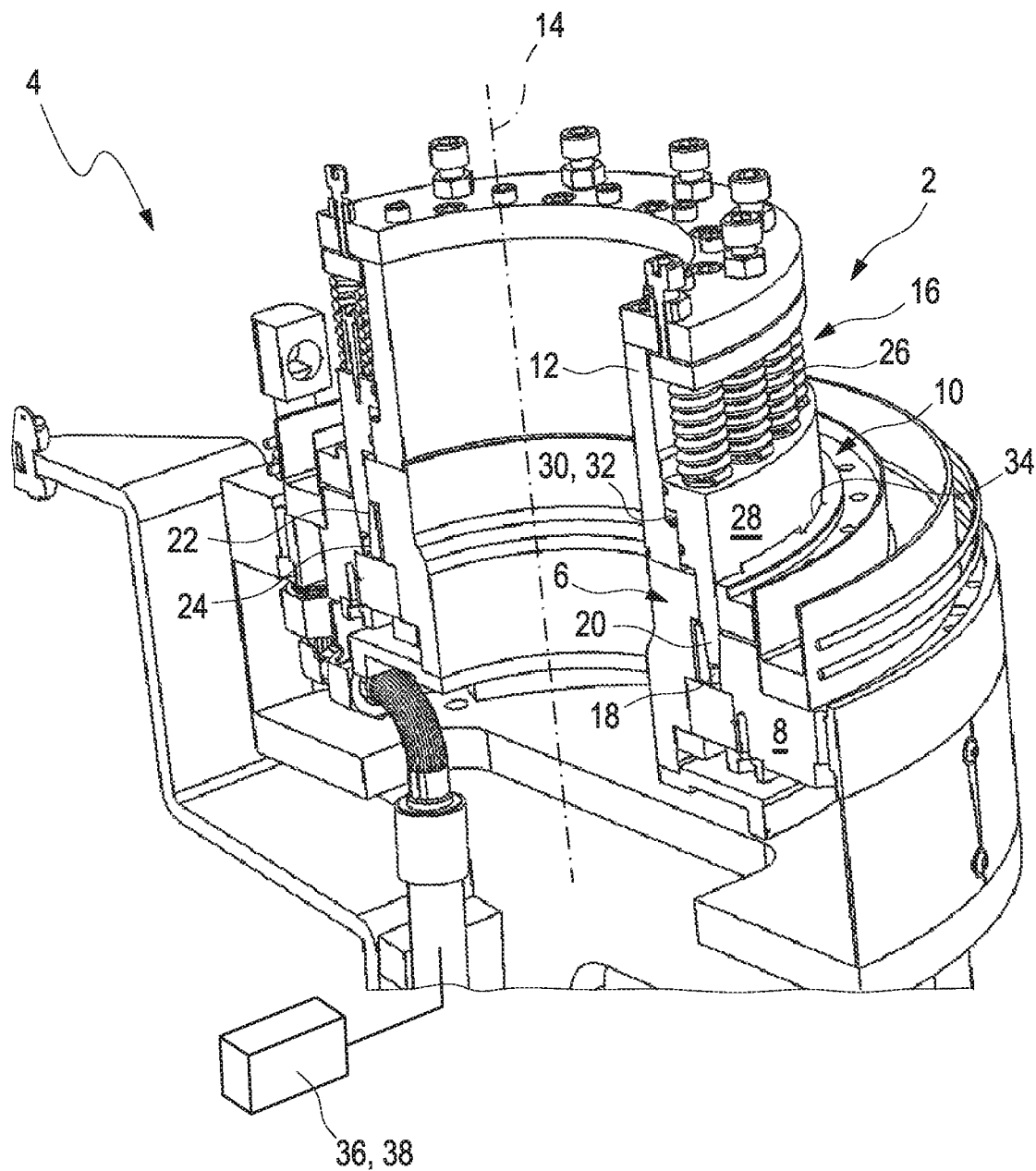
FIG. 1 is a cutaway perspective front view of an embodiment of the securing device.

FIG. 1 shows a securing device for a rotatably mounted object 4, which is generally designated by the reference numeral 2. The object 4 may be a manipulator, for example a direct drive.

The securing device 2 comprises a receiving unit 6, which is fixed against rotation on a first component 8 of the object 4. In addition, the securing device 2 comprises a clamping unit 10, which is fixed to a second component 12 of the object 4. The second component 12 is moveable manually or by means of a rotary drive, in particular direct drive, relative to the first component 8 via a rotatably mounted joint about a rotational and/or swivel axis 14.

In addition, the securing device 2 comprises a drive unit 16, in the clamping unit 10 in a release position in which the first component 8 and the second component 12 are released for rotation relative to each other, which can be transferred parallel to the rotational and/or swivel axis 14 in a clamping position, in which the clamping unit 10 in the receiving unit 6 frictionally and/or non-positively engages. In the second functional position, the first component 8 and the second component 12 are fixed against rotation about the rotational and/or swivel axis 14 relative to one another.

In the embodiment of the securing device 2 shown in the figures, the receiving unit 6 comprises a recess 18, which runs concentrically to the rotational and/or swivel axis 14. In the embodiment shown in the figures, the recess 18 and the receiving unit 6 is formed integrally with the first component 8.

In addition, the clamping unit 10, in the embodiment shown in the figures, comprises a plurality of clamping means 20 which are moveable in the recess 18 and can be arranged adjacently there frictionally and/or non-positively directly in the recess.

In order to facilitate arranging the clamping means 20 in the recesses 18, the clamping means 20 comprise a tapered guide section 22 and the recess 18, on the side facing the clamping means 20 of the clamping unit 10, has a receiving section 24 formed in a particularly viewable way.

In the embodiment of the securing device 2 shown in the figures, the drive unit 16 comprises a plurality of spring means 26, which are supported on the one hand on the second component 12 of the object 4 and on the other hand supported on an annular support 28 of the clamping unit 10. On the annular support 28 of the clamping unit 10, the plurality of clamping means 20 are arranged.

In order to hold the clamping unit 10 in the release position, the securing device 2 comprises a locking means 30, which is formed in the embodiment shown in the figures by a hydraulically active fluid. This is arranged in a cavity 32 which is formed between the second component 12 and the support 28 of the clamping unit 10. The cavity 32 is connected via a valve with a ring line 32A and thereby acted upon by pressure or in a pressure reducing manner.

In the embodiment shown in the figures, the drive unit 16 comprises a plurality of spring means 26, which are arranged like a crown around the rotational and/or swivel axis 14. This makes it possible to achieve an at least almost homogeneous force distribution along the support 28 of the clamping unit 10.

FIG. 1 shows a section through an exemplary embodiment of the securing device 2. Here, the clamping unit 10 is shown in a clamping position. In the clamping position, the clamping means 20 engage in the recess 18 of the receiving unit 6 and act by a frictional and/or non-positive connection such that the first component 8 and second component 12 are rotationally fixed relative to each other. In this case, the clamping means 20 penetrate parallel to the rotational and/or swivel axis 14 extending through openings 34 in the second component 12 and are arranged in recess 18, integrally formed with the first component 8, of the receiving unit 6 frictionally and/or non-positively.

FIG. 2 shows a detailed view of receiving unit 6, clamping unit 10 and drive unit 16.

FIG. 3 shows a perspective detailed view of the clamping unit 10. It can be seen from FIG. 3 that the clamping unit 10 comprises the ring-like support 28 and a plurality of clamping means 20 extending in the manner of teeth in the direction of the recess 18.

FIG. 4 shows a schematic flowchart of a method for operating a securing device. In this case, in a first step 100, a triggering condition is detected by a sensor means 38 assigned to a control unit 36, such as a pressure sensor, temperature sensor, piezoelectric sensor. Control unit 36 and sensor means 38 are shown only schematically in FIG. 1.

In a further step 101, the drive unit 16 for transferring the clamping unit 10 from a release position, in which the first component 8 and the second component 12 are released for moving, in particular rotating, relative to each other, in a locking position in which the clamping unit 10 engages the receiving unit 6 frictionally and/or non-positively, and fixes the first component 8 and the second component 12 against moving relative to each other.

The features of the invention disclosed in the foregoing description, in the claims and in the drawing, may be essential both individually and in any combination in the realisation of the invention in its various embodiments.

REFERENCE LIST 2 securing device
4 object
6 recording unit
8 first component
10 clamping unit
12 second component
14 rotational and/or swivel axis
16 drive unit
18 recess
20 clamping means
22 guide section
24 receiving section
26 spring means
28 support
30 locking means
32 cavity
34 through opening
36 control unit
38 sensor means

The invention claimed is:

1. A securing device for a rotatably mounted object comprising:
   at least one receiving unit, which is fixed against rotation on a first component of the object,
   at least one clamping unit which is fixed against rotation to a second component of the object, which manually or by means of a rotary drive is moveable relative to the first component via a rotatably mounted joint about a rotational and/or swivel axis via a rotationally mounted joint, and
   at least one drive unit through which the clamping unit is able to be transferred from a release position, in which the first component and the second component are released for rotation relative to each other, parallel to the rotational and/or swivel axis to a clamping position, in which the clamping unit frictionally and/or non-positively engages in the receiving unit, and the first component and the second component are fixed relative to each other against rotation about the rotary and/or swivel axis,
   wherein the at least one receiving unit comprises at least one recess extending concentrically to an axis of rotation and/or swivel and extending in the direction of the axis of rotation and/or swivel, the at least one recess comprising a receiving section, in particular of funnel-like design, on a side facing clamping means of the clamping unit,
   wherein the at least one clamping unit comprises the at least one clamping means which is able to be arranged such that the clamping means is able to be moved into the recess and is able to be arranged such that the clamping means bears directly in a frictional and/or non-positive manner and, on a side facing the recess of the receiving unit, comprises a guide section, in particular a tapering guide section, and
   wherein the drive unit comprises at least one pneumatic, hydraulic and/or mechanically active locking means which fixes the at least one clamping means in the release position.

2. The securing device according to claim 1, wherein the guide section of the clamping means and/or the receiving section of the recess with respect to the rotational and/or swivel axis comprises an angle of 0° to 30° and/or that the guide section of the clamping means and/or the receiving section of the recess comprises a surface and/or a surface coating having a coefficient of friction between 0.05 and 0.8.

3. The securing device according to claim 1, wherein the drive unit comprises at least one pneumatic, hydraulic and/or mechanical tensionable spring means, which clamps the at least one clamping means with a clamping force in the clamping position.

4. The securing device according to claim 3, wherein the locking means of the drive unit comprises in a basic position a counteracting and equal restoring force to the clamping force of the spring means, with which the locking means acts on the clamping means and holds by force equilibrium in the release position, and that the locking means in an emergency position comprises a reduced restoring force relative to the basic position and releases the clamping means for transferring into the clamping position.

5. The securing device according to claim 4, wherein the locking means comprises a pressurisable, hydraulically or pneumatically effective fluid, which runs in a cavity, between the clamping means of the clamping unit and the second component of the object arranged cavity and/or that the drive unit comprises a ring line and at least one valve, through which the cavity is able to be brought into fluid communication with the ring line.

6. The securing device according to claim 3, further comprising at least one control unit configured to adjust at least the restoring force of the locking means to transfer the at least one clamping means into the clamping position, and the at least one control unit comprising at least one sensor means configured to detect at least one triggering condition and/or a pressure in the cavity, wherein the at least one control unit is configured to transfer the locking means from a basic position to an emergency position when the triggering condition and/or the pressure is detected.

7. The securing device according to claim 1, wherein the at least one clamping unit comprises a plurality of clamping means which are arranged on an annular support and wherein the second component comprises a plurality of through holes parallel to the rotation and/or swivel axis extending through openings in which the plurality of clamping means are arranged,
   wherein the annular support, in the release position, is spaced from the second component and, in the clamping position, the annular support is moved in the direction of the second component and/or is moved to rest against the second component.

8. The securing device according to claim 1, wherein the at least one drive unit comprises a plurality of spring means which are arranged concentrically to the swivel axis and/or swivel axis and together clamping the clamping unit, in the clamping position.

9. The securing device according to claim 1, wherein the at least one receiving unit and the first component comprise a common component and/or that the receiving unit comprises a flange that is or can be fixed indirectly or directly and rotationally fixed to the first component releasably or permanently.

10. A method for operating a securing device of a rotatably mounted object, which comprises at least one receiving unit which is fixed against rotation on a first component of the object, at least one clamping unit, which is fixed non-rotatably on a second component of the object, which is manually or by means of a rotary drive moveable relative to the first component via a rotatably mounted joint about a rotational and/or swivel axis, and which comprises at least one drive unit, the method comprising the steps:
   detecting a triggering condition by sensor means associated with a control unit;
   directing the drive unit for transferring the clamping unit from a release position, in which the first component and the second component are released for moving relative to each other, to a locking position in which the clamping unit engages the receiving unit frictionally and/or non-positively, and fixes the first component and the second component against moving relative to each other,
   wherein the at least one receiving unit comprises at least one recess extending concentrically to an axis of rotation and/or swivel and extending in the direction of the axis of rotation and/or swivel, the at least one recess comprising a receiving section, in particular of funnel-like design, on a side facing clamping means of the clamping unit,
   moving the clamping means of the clamping unit into the recess such that the clamping means bears directly in a frictional and/or non-positive manner and, wherein the clamping means comprises, on a side facing the recess of the receiving unit, a guide section, in particular a tapering guide section, and fixing the at least one clamping means in the release position using at least one pneumatic, hydraulic and/or mechanically active locking means of the drive unit.

* * * * *